United States Patent [19]

Ogawa et al.

[11] 4,328,133

[45] May 4, 1982

[54] ORGANIC MICRO-FIBER REINFORCED RUBBER COMPOSITIONS

[75] Inventors: Masaki Ogawa, Sayama; Yasushi Hirata, Higashimurayama; Mikihiko Ikegami, Tokorozawa, all of Japan

[73] Assignee: Bridgestone Tire Company Limited, Tokyo, Japan

[21] Appl. No.: 276,548

[22] Filed: Jun. 23, 1981

[30] Foreign Application Priority Data

Jun. 25, 1980 [JP] Japan ................................. 55/85064
Aug. 4, 1980 [JP] Japan ................................. 55/106355

[51] Int. Cl.³ ........................ C08L 69/00; C08K 3/04; C08L 7/00; C08L 9/00
[52] U.S. Cl. .................................... 524/505; 525/146; 525/148; 525/154; 525/199; 515/210; 515/211; 515/214; 515/231; 515/232; 515/233; 515/235; 515/239; 515/240; 515/241; 260/726; 524/502; 524/512; 524/518; 524/520; 524/521; 524/526; 524/525; 428/401
[58] Field of Search .................... 260/42, 42.28, 42.27, 260/42.46, 42.47, 37 PC, 37 AL, 3, 3.3, 3.5, 4 R, 4 AR, 5

[56] References Cited

U.S. PATENT DOCUMENTS

| | | | |
|---|---|---|---|
| 3,827,991 | 8/1974 | Ando et al. | 260/5 |
| 3,852,225 | 12/1974 | Ishikawa et al. | 260/5 |
| 4,193,437 | 3/1980 | Powell | 260/42.47 |
| 4,215,021 | 7/1980 | Ogawa et al. | 260/42.47 |
| 4,255,296 | 3/1981 | Ogawa et al. | 260/42 |
| 4,257,468 | 3/1981 | Ogawa et al. | 260/5 |

OTHER PUBLICATIONS

Derwent Abst. 85123B/47 (J54132645) 10-15-79 Bridgestone Tire "Rubber Compsn for Tyres . . . ".

*Primary Examiner*—Herbert J. Lilling
*Attorney, Agent, or Firm*—Sughrue, Mion, Zinn, Macpeak and Seas

[57] ABSTRACT

Organic micro-fiber reinforced rubber compositions having high elastic modulus, excellent crack growth resistance, impact cut resistance and rebound resilience and a small swell value are prepared by incorporating 10-100 parts by weight of carbon black, 3-30 parts by weight of organic micro-fibers based on 100 parts by weight of at least one rubber selected from a group consisting of natural rubber, synthetic polyisoprene rubber, butyl rubber, halogenated butyl rubber, polybutadiene rubber, styrene-butadiene copolymeric rubber, ethylene-propylene-diene ternary copolymeric rubber and acrylonitrile-butadiene copolymeric rubber, said micro-organic staple fibers being lower than 30° C. or higher than 120° C. in glass transition temperature of amorphous portion and higher than 160° C. in melting point of crystal portion, and having an average length of the micro-fibers of 0.8-30 μm, an average diameter of the micro-fibers of 0.02-0.8 μm and a ratio of the average length of the micro-fibers to the average diameter of the micro-fibers of 8-400.

3 Claims, No Drawings

ORGANIC MICRO-FIBER REINFORCED RUBBER COMPOSITIONS

The present invention relates to micro-fiber reinforced rubbers, more particularly to organic micro-fiber reinforced rubber compositions having a high elastic modulus and noticeably excellent crack growth resistance, impact cut resistance and rebound resilience, which are otained by incorporating organic micro-fibers wherein glass transition temperature of amorphous portion is lower than 30° C. or higher than 120° C.

It has been generally known that the elastic modulus of rubbers is enhanced by increasing an amount of carbon black. However, if it is attempted to enhance the elastic modulus of rubbers by using a reinforcing filler, such as carbon black, there has been demerit that hysteresis loss of rubber is increased therewith.

As other means for enhancing the elastic modulus of rubbers than the above described method, it has been well known that micro-fibers of nylon, vinylon, polyester and the like are incorporated in rubbers. Although the rubbers reinforced with these micro-fibers have a high reinforcing ability, a high shear stress is applied to the micro-fiber terminal ends and the rubber is broken therefrom and the adhesion of these micro-fibers to rubber is not satisfactory, so that the above described broken portion is apt to grow along the micro-fiber surface and as the result the adhering surface is broken to form large creeps and when repeating stretch is given, the breaking life of rubber is very short.

In order to obviate these defects, rubber compositions, which prevent the formation of creeps by micronizing the fibers to make the stress applied to each fiber smaller, and have high reinforcement, crack growth resistance and impact cut resistance, which are intrinsically possessed by micro-fiber reinforced rubbers, have been proposed as described in U.S. Pat. No. 4,255,296.

Recently, the saving of resources and energy has been socially demanded and the study for developing automobiles having low gasoline consumption has been directed to tires in which the combustion cost is low, in view of decrease of the loss of the driving force due to tires, other than the improvement of engines.

It has been generally known that if the rolling resistance of tire is made smaller, the automotive gasoline consumption is saved and a factor by which the rolling resistance of tire is greatly influenced is the rubber quality, that is the kind and physical properties of rubbers. Namely, if materials having low glass transition temperature and hysteresis loss are used, the rolling resistance can be reduced.

However, the micro-fibers described in U.S. Pat. No. 4,255,296 are micro-fibers of organic high polymers consisting of syndiotactic-1,2-polybutadiene, so that the maximum of hysteresis loss due to the glass transition temperature (30°-40° C.) of its amorphous portion lies in within the range of 30° C.-120° C., which is the heat generation temperature of tire when running under the condition of general use, so that it is difficult to reduce the hysteresis loss and even if the creep is improved by improvement of the crack growth resistance as mentioned above, the use of such micro-fibers have been highly negative for the tires of low combustion cost.

The inventors have diligently studied rubber compositions in which the elastic modulus is high, the impact cut resistance and crack growth resistance are noticeably excellent and the hysteresis loss which is very useful as the tires of low combustion cost, is considerably improved and found that desired rubber compositions can be obtained by incorporating a particularly defined amount of carbon black and a particularly defined organic micro-fibers to a rubber and the present invention has been accomplished.

The present invention consists in rubber compositions in which 10-100 parts by weight of carbon black and 3-30 parts by weight of organic micro-fibers are incorporated based on 100 parts by weight of at least one rubber selected from the group consisting of natural rubber, synthetic polyisoprene rubber, butyl rubber, halogenated butyl rubber, polybutadiene rubber, styrene-butadiene copolymeric rubber, ethylene-propylene-diene ternary copolymeric rubber and acrylonitrile-butadiene copolymeric rubber, and which are characterized in that said organic micro-fibers are ones in which a glass transition temperature of the amorphous portion is lower than 30° C. or higher than 120° C., a melting point of the crystal portion is higher than 160° C., an average length of the micro-fibers is 0.8-30 $\mu$m, an average diameter of the micro-fibers is 0.02-0.8 $\mu$m and a ratio of the average length of the micro-fibers to the average diameter of the micro-fibers is 8-400.

The term "organic micro-fibers" used herein means ones having a glass transition temperature of the amorphous portion being lower than 30° C. or higher than 120° C., an average length of micro-fibers of 0.8-30 $\mu$m, an average diameter of micro-fibers of 0.02-0.8 $\mu$m, a ratio of the average length of micro-fibers to the average diameter of micro-fibers of 8-400 and a melting point of the crystal portion being higher than 160° C., for example, micro-fibers composed of polyvinylidene chloride, polyvinylidene fluoride, poly-p-tert-butylstyrene, poly-p-chlorostyrene, polydichlorostyrene, poly-$\alpha$-methylstyrene, poly-2-methylstyrene, poly-2,5-dimethylstyrene, poly-trimethylstyrene, poly-p-phenylstyrene, poly-o-vinylbenzyl alcohol, poly-p-vinylbenzyl alcohol, isotacticpolypropylene, poly-4-methyl-1-pentene, poly-vinylnaphthalene, poly-oxymethylene, poly-bisphenol A carbonate, poly-2,3-dimethylbutadiene and the like. The glass transition temperature of the amorphous portion should be lower than 30° C. or higher than 120° C. based on the following reason. The heat generation temperature of tire upon running under usual use conditions is within a range of about 30° C.-120° C., so that in the micro-fibers having a glass transition temperature of amorphous portion being within this range, the hysteresis loss becomes larger in ordinary case. Furthermore, since the glass transition temperature of rubber is about $-50°$ C., if the affinity with rubber is taken into consideration, organic micro-fibers having a glass transition temperature of lower than 30° C. are preferable.

The reason why the average length of micro-fibers of the above described organic micro-fibers is 0.8-30 $\mu$m, the average diameter of the micro-fibers is 0.02-0.8 $\mu$m and the ratio of the average length of the micro-fibers to the average diameter of the micro-fibers is 8-400 is as follows. When the average length of the micro-fibers is less than 0.8 $\mu$m, the crack growth resistance of the rubber composition is not satisfactorily improved and when said length exceeds 30 $\mu$m, the processability, such as kneading using Banbury mixer and the like is considerably deteriorated and such lengths are not desirable. When the average diameter of the micro-fibers is less than 0.02 $\mu$m, the micro-fibers are cut and become too short in the processing step, such as kneading or seating by means of roll and when said average diameter exceeds 0.8 μm, the stress per surface area of the micro-fibers becomes larger and a fear that the surface contacting rubber is broken, occurs and therefore large creeps are caused in the formed rubber composition and the flex resistance is deteriorated and such diameters are not preferable. When the ratio of the average length of micro-fibers to the average diameter of micro-fibers is less than 8, the high reinforcement, impact cut resistance and crack growth resistance which are the intrinsic features of reinforcement with micro-fibers, are noticeably deteriorated and when said ratio exceeds 400, the stress applied in the working becomes larger than the strength of the micro-fibers, so that the micro-fibers are cut, so that these ratios are not preferable. The melting point of the crystal portion in the organic micro-fibers must be higher than 160° C. and this is because the temperature when tires are running or produced, may become one hundred and several tens degrees centrigrade and in this case if the micro-fibers are dissolved and again hardened, the shape is varied and the desired reinforcing effect cannot be expected.

The organic micro-fibers are incorporated in an amount of 3–30 parts by weight based on 100 parts by weight of rubber and in this case, two or more above described organic micro-fibers may be incorporated. When the incorporated amount is less than 3 parts by weight, the effect cannot be substantially expected and when said amount exceeds 30 parts by weight, the processability is considerably deteriorated and these amounts are not preferable.

Furthermore, the organic micro-fibers can be, for example, produced in the following manner. Explanation will be made with reference to isotactic-polypropylene. Polymerized powdery isotactic-polypropylene is swelled with n-hexane at 60° C. and crushed to obtain slurry form and then ejected from die under a pressure of 90–110 kg/cm$^2$ to obtain micro-fibers. The resulting fibers are again dispersed in n-hexane and mixed and stirred with a polymer cement and then subjected to usual drying process of rubber to obtain a master batch. In this case, the length, diameter and ratio of length to diameter of the obtained organic micro-fibers can be varied by controlling the solvent used for swelling, the temperature and the pressure when being ejected from die. The formation of the master batch of the organic micro-fibers is based on the reason that the micro-fibers can be relatively easily uniformly dispersed in rubber but it is possible to directly mix rubber with micro-fibers together with usually used additives, such as carbon black, etc. Explanation has been made herein with respect to isotactic-polypropylene but the other organic micro-fibers can be produced in the same manner by swelling the fibers with a relatively poor solvent and crushing the swelled fibers to form a slurry. The solvent may be prepared by mixing a good solvent with a poor solvent in a proper mixing ratio.

In the present invention, it is necessary to incorporate 10–100 parts by weight of carbon black based on 100 parts by weight of rubber. When the incorporated amount is less than 10 parts by weight, the breaking strength of the obtained rubber composition is lowered and such an amount is not preferable and when said amount exceeds 100 parts by weight, the processability is considerably deteriorated and such an amount is not preferable.

In the present invention, the above described organic micro-fibers may be incorporated with a vulcanizer, an accelerator, an accelerating assistant, a filler such as silica and the like, a softener and the like within usual incorporated amount.

In the rubber compositions of the present invention having the above described constituent, the elastic modulus is high and the impact cut resistance is excellent and the crack growth resistance is noticeably improved as compared with that of rubber compositions reinforced with conventional micro-fibers of nylon, vinylon, polyester and the like, so that the creep becomes noticeably smaller, and further the rebound resilience is more improved than prior organic micro-fibers, that is the hysteresis loss is noticeably reduced, so that the rubber compositions are very useful for industrial and engineering materials, such as tires, conveyor belts, hoses and the like.

The above described micro-fiber reinforced rubbers are low in the swell upon extrusion, so that these rubbers provide cord coating rubber compositions for reinforcing tires having improved dimension stability and high elastic modulus and a low energy loss.

It has been very difficult for coating rubber for carcass and breaker of prior tires to make thin and uniform thickness, for example, when unvulcanized rubber is extruded from a die, an extruded body having a larger shape than a die size is obtained because of the intrinsic rubber elasticity of unvulcanized rubber. This phenomenon is referred to as "swell" but when this swell is large, when cords are coated with rubber, the formed rubber layer becomes partially thick and it is difficult to coat the cords uniformly with rubber, so that it has been generally carried out that the thickness of the coated rubber is previously made to be more or less thick. Thus, it is essential that the swell of the coating rubber is small in order to obtain a thin coating having uniform thickness but it has been found that if the organic micro-fibers having the particularly defined size of the present invention are incorporated, the swell value in the unvulcanized state is small as shown in Examples.

The swell value of tire cord coating rubber compositions of the present invention is not more than 130% but it is difficult for rubber compsitions wherein the swell value is larger than 130% to obtain coating having a uniform thickness when a cord layer is coated with rubber. The term "swell value" used herein means numeral values indicating in percentage values obtained by dividing a rubber diameter by a die diameter when a rubber composition at 100° C. is extruded through a circular nozzle having a diameter of 2 mm and a length of 4 mm at a strain speed of 200 sec$^{-1}$. The larger the value, the larger the swell is.

In the present invention, cords to be coated may include natural or synthetic organic fiber cords, glass cords, metal cords, etc.

If it is possible to make the thickness of the tire reinforcing cord coating rubber compositions thin, the weight of the carcass and breaker portions of tires can be reduced and the gauge can be made thin and it is possible to reduce the rolling resistance of tires and to improve the heat separation resistance.

The following examples are given for the purpose of illustration of this invention and are not intended as limitations thereof.

EXAMPLES 1-9, COMPARATIVE EXAMPLES 1-28

40 parts by weight of HAF carbon black, 5 parts by weight of aromatic oil, 2 parts by weight of stearic acid and 10 parts by weight of each of 37 kinds of organic micro-fibers shown in the following Table 1 were incorporated based on 100 parts by weight of synthetic polyisoprene rubber and the resulting rubber compositions were kneaded at rubber temperature of 155° C. for 5 minutes by means of Banbury mixer (50 r.p.m.) and then 4 parts by weight of zinc oxide, 0.5 parts by weight of N-oxydiethylene-2-benzothiazolesulfenamide and 2 parts by weight of sulfur were incorporated therein to prepare 37 kinds of rubber compositions. With respect to these rubber compositions, the average rebound resilience and the process history of the micro-fibers were evaluated and the obtained results are shown in Table 1. The evaluating methods are as follows.

Average rebound resilience

The rebound resilience was evaluated at 30° C., 69° C., 90° C. and 120° C. following to BS 903 part 19 and the obtained values was averaged. However, if the quality of the organic micro-fibers is different, even if the incorporated amount is equal, the elastic modulus is not always coincident, so that it is difficult to apparently show the effect of the present invention by mere comparison between the respective rubber compositions. Accordingly, 5 parts by weight of aromatic oil, 2 parts by weight of stearic acid, 1 part by weight of zinc oxide, 0.5 part by weight of N-oxydiethylene-2-benzothiazolesulfenamide, 2 parts by weight of sulfur were incorporated based on 100 parts by weight of synthetic polyisoprene rubber by varying an amount of HAF carbon black to prepare several rubber compositions and 100% elastic modulus and rebound resilience at 30° C., 60° C., 90° C. and 120° C. were measured with respect to these rubber compositions and at the respective temperature, the elastic modulus was shown in abscissa and the rebound resilience was shown in ordinate and the master curves were formed. From these master curves, the rebound resilience of the rubber composition reinforced with only carbon black, which corresponds to the elastic modulus of the micro-fiber reinforced rubber composition to be evaluated, was read and this rebound resilience was referred to as 100 and the rebound resilience of the micro-fiber reinforced rubber composition to be evaluated at a certain temperature was determined. The larger the value, the better this property is.

Process history of micro-fibers

An average length and an average diameter of organic micro-fibers in raw rubber have been previously measured and then rubber compositions were prepared as mentioned above, after which an average length and an average diameter of the organic micro-fibers were determined and when these values were more than 85% of the average length and the average diameter in the raw rubber, a mark o was given and when these values did not reach 85%, a mark × was given.

An average diameter and an average length of organic micro-fibers were determined as follows. The raw rubbers (or rubber compositions) containing the organic micro-fibers were extruded under conditions of $L/D=4$, 100° C. and 20 sec$^{-1}$ by means of capillary rheometer and then vulcanized in a vulcanizing pan at 4 kg/cm$^2$ and 150° C. for 1 hour. The vulcanized products were cut into extremely thin pieces in perpendicular direction and parallel direction with respect to the extruded direction and the diameter and length of the micro-fibers were measured by an electron microscope. The average diameter and average length were determined by the following formulae.

$$\bar{r} = \Sigma n_i r_i / \Sigma n_i \quad \bar{l} = \Sigma n_i l_i / \Sigma n_i$$

$\bar{r}$: average diameter,
$\bar{l}$: average length,
ri: diameter of micro-fibers,
li: length of micro-fibers,
ni: number of micro-fibers having a diameter ri and a length li,
$\Sigma$ni: 300.

TABLE 1(a)

| | | Organic micro-fibers | | | | | | |
|---|---|---|---|---|---|---|---|---|
| | | Material | $\bar{l}$ (μm) | $\bar{r}$ (μm) | $\bar{l}/\bar{r}$ | Glass transition temperature (°C.) | Melting point (°C.) | Rebound resilience | Process history |
| Comparative Example 1 | | Polyethylene | 12 | 0.4 | 30.0 | −125 | 142 | 105 | x |
| Example 1 | | Isotactic-polypropylene | 10 | 0.3 | 33.3 | −8 | 176 | 125 | o |
| Comparative Example 2 | | Poly-1-butene | 9 | 0.3 | 30.0 | −24 | 130 | 102 | x |
| Example 3 | Polyolefin | Poly-1-pentene | 10 | 0.35 | 28.6 | −40 | 130 | 103 | x |
| Example 4 | | Poly-3-methyl-1-butene | 10 | 0.3 | 33.3 | 50 | 300 | 102 | o |
| Example 5 | | Poly-1-octadecene | 13 | 0.3 | 43.3 | 55 | 100 | 93 | x |
| Example 6 | | Poly(3-phenyl-1-propene) | 11 | 0.4 | 27.5 | 60 | 208 | 96 | o |
| Example 2 | | Poly-4-methyl-1-pentene | 12 | 0.4 | 30.0 | 29 | 235 | 129 | o |
| Comparative Example 7 | | Isotactic-polyvinyl alcohol | 9 | 0.2 | 45.0 | 85 | 212 | 96 | o |
| Example 8 | | Polyvinyl chloride | 10 | 0.35 | 28.6 | 81 | 212 | 101 | o |
| Example 3 | Polyvinyl compound | Polyvinyl naphthalene | 12 | 0.3 | 40.0 | 162 | 360 | 130 | o |
| Comparative Example 9 | | Syndiotactic-polyvinyl alcohol | 11 | 0.35 | 31.4 | 85 | 228 | 96 | o |
| Example 10 | | Polyvinyl fluoride | 12 | 0.4 | 40.0 | 31 | 200 | 99 | o |
| Example 11 | | Poly-2-vinylpyridine | 12 | 0.35 | 34.3 | 104 | 212 | 102 | o |

TABLE 1(b)

| | | | Organic micro-fibers | | | | | | |
|---|---|---|---|---|---|---|---|---|---|
| | | Material | l̄ (μm) | r̄ (μm) | l̄/r̄ | Glass transition temperature (°C.) | Melting point (°C.) | Rebound resilience | Process history |
| Example 4 | Poly- | Polyvinylidene fluoride | 10 | 0.3 | 33.3 | −50 | 171 | 123 | o |
| Example 5 | vinylidene | Polyvinylidene chloride | 11 | 0.25 | 44.0 | −19 | 190 | 122 | o |
| Comparative Example 12 | | Polystyrene | 10 | 0.4 | 25.0 | 100 | 240 | 103 | o |
| Example 6 | Poly- | Poly-p-tert-butylstyrene | 11 | 0.3 | 36.7 | 130 | 300 | 128 | o |
| Comparative Example 13 | styrene | Poly-4-methylstyrene | 12 | 0.35 | 34.3 | 93 | 215 | 99 | o |
| Example 14 | | Poly-3-methylstyrene | 12 | 0.35 | 34.3 | 95 | 265 | 99 | o |
| Example 15 | | Poly-4-chlorostyrene | 11 | 0.3 | 36.7 | 95 | 265 | 99 | o |
| Comparative Example 16 | Polydiene | Syndiotactic-1,2-polybutadiene | 12 | 0.4 | 30.0 | 40 to 50 | 205 | 96 | o |
| Example 7 | | 1,4-Poly-2,3-dimethylbutadiene | 10 | 0.35 | 28.6 | −11 | 192 | 126 | o |
| Example 8 | Poly-carbonate | Poly-bisphenol A carbonate | 9 | 0.4 | 22.5 | 420 | 540 | 125 | o |

TABLE 1(c)

| | | | Organic micro-fibers | | | | | | |
|---|---|---|---|---|---|---|---|---|---|
| | | Material | l̄ (μm) | r̄ (μm) | l̄/r̄ | Glass transition temperature (°C.) | Melting point (°C.) | Rebound resilience | Process history |
| Comparative Example 17 | | Syndiotactic-polyethyl acrylate | 9 | 0.25 | 36.0 | −24 | 47 | 102 | x |
| Example 18 | Poly-acrylate | Isotactic-polyethyl acrylate | 10 | 0.35 | 28.6 | −24 | 47 | 101 | x |
| Example 19 | | Syndiotactic-polymethyl methacrylate | 12 | 0.3 | 40.0 | 105 | 200 | 99 | o |
| Example 20 | | Poly-tert-butyl acrylate | 11 | 0.35 | 31.4 | 107 | 193 | 98 | o |
| Example 9 | | Polyoxymethylene | 10 | 0.35 | 28.6 | −83 | 181 | 135 | o |
| Comparative Example 21 | Polyether | Polyoxyethylene | 9 | 0.3 | 30.0 | −41 | 66 | 104 | x |
| Example 22 | | Polyoxycyclobutane | Not form staple fiber | | | −75 | 37 | 103 | x |
| Comparative Example 23 | | 6-Nylon | 10 | 0.3 | 33.3 | 40 to 87 | 220 | 97 | o |
| Example 24 | Polyamide | 6,6-Nylon | 10 | 0.25 | 40.0 | 50 | 260 | 98 | o |
| Example 25 | | 12-Nylon | 11 | 0.35 | 31.4 | 41 | 218 | 99 | o |
| Comparative Example 26 | | Polyethylene terephthalate | 10 | 0.3 | 33.3 | 69 | 260 | 98 | o |
| Example 27 | Polyester | Polyethylene isophthalate | 10 | 0.25 | 40.0 | 51 | 240 | 96 | o |
| Example 28 | | Polytetramethylene terephthalate | 11 | 0.30 | 36.7 | 80 | 232 | 99 | o |

As seen from Table 1, in the rubber compositions of the present invention in which organic micro-fibers having a glass transition temperature of lower than 30° C. or higher than 120° C. and a melting point of higher than 160° C. are incorporated, the rebound resilience is noticeably improved without causing any process history in the organic micro-fibers.

EXAMPLES 10–12, COMPARATIVE EXAMPLES 29–34

10 parts by weight of isotactic-polypropylene having various forms as shown in Table 2 was incorporated as the organic micro-fibers based on 100 parts by weight of synthetic polyisoprene rubber and the other compounding agents were incorporated in the same manner as described in Example 1 to prepare nine kinds of rubber compositions. The roll processability, crack growth resistance and impact cut resistance of these compositions and the process history of the micro-fibers were evaluated and the obtained results are shown in Table 2.

The evaluating methods are as follows.

Roll processability

Roll baggy when the mixture was kneaded by 10 inch rolls was checked.

Crack growth resistance

Crack having a width of 2 mm was formed at center of a vulcanized rubber sheet having a width of 5 cm and a thickness of 2 mm and 50% distortion was applied at a vibration of 300 cycle/min and the time until this rubber sheet was cut, was determined. This value is greatly influenced by the elastic modulus of rubber, so that following to the method for evaluating the average rebound resilience in Example 1, a value of a rubber composition reinforced with only carbon black having the same 100% elastic modulus was referred to as 100 and the value of the organic micro-fiber reinforced rubber compositions to be evaluated was shown. The higher this value, the better this property is.

Impact cut resistance

A blade having an angle of 45° is striken against a vulcanized rubber composition having a thickness of 8 cm at a speed of 894 m/sec and the depth of the cut was determined. The evaluation was made by comparison with a rubber composition reinforced with only carbon black in the same manner as in the above described crack growth resistance. The higher this value, the better this property is.

TABLE 2

|  |  | Comparative Example 29 | Comparative Example 30 | Example 10 | Example 11 | Example 12 | Comparative Example 31 | Comparative Example 32 | Comparative Example 33 | Comparative Example 34 |
|---|---|---|---|---|---|---|---|---|---|---|
| Organic micro-fibers | l μm | 1.0 | 0.6 | 0.8 | 5.0 | 29 | 33 | 25 | 28.5 | 5.6 |
|  | r μm | 0.01 | 0.04 | 0.02 | 0.08 | 0.8 | 0.6 | 1.2 | 0.07 | 0.8 |
|  | l/r | 100 | 15 | 40 | 62.5 | 36.3 | 55 | 20.8 | 407 | 7 |
| Result | Roll processability | o | o | o | o | o | x | o | o | o |
|  | Crack growth resistance | 105 | 109 | 173 | 218 | 285 | 176 | 81 | 112 | 97 |
|  | Impact cut resistance | 75 | 99 | 115 | 118 | 121 | 121 | 118 | 112 | 82 |
|  | Process history | x | o | o | o | o | o | o | x | o |

As seen from Table 2, the rubber compositions of the present invention are noticeably excellent in the crack growth resistance and impact cut resistance, and the processability is better.

EXAMPLES 13–15, COMPARATIVE EXAMPLES 35–37

Rubber compositions having the composition as shown in Table 3 were prepared and the roll processability, crack growth resistance and impact cut resistance were determined in the same manner as in Example 10. The obtained results are shown in Table 3.

TABLE 3

|  | Comparative Example 35 | Comparative Example 36 | Example 13 | Example 14 | Example 15 | Comparative Example 37 |
|---|---|---|---|---|---|---|
| Synthetic polyisoprene rubber | 70 | 70 | 70 | 70 | 70 | 70 |
| Polybutadiene rubber | 30 | 30 | 30 | 30 | 30 | 30 |
| Isotactic-polypropylene micro-fiber *1 | 1 | 2 | 3 | 10 | 30 | 35 |
| HAF carbon black | 35 | 35 | 35 | 35 | 35 | 35 |
| Aromatic oil | 5 | 5 | 5 | 5 | 5 | 5 |
| Stearic acid | 1 | 1 | 1 | 1 | 1 | 1 |
| Zinc oxide | 4 | 4 | 4 | 4 | 4 | 4 |
| N-oxydiethylene-2-benzothiazole sulfenamide | 0.7 | 0.7 | 0.7 | 0.7 | 0.7 | 0.7 |
| Sulfur | 1.5 | 1.5 | 1.5 | 1.5 | 1.5 | 1.5 |
| Roll processability | No | No | No | No | Somewhat good | Good |
| Crack growth resistance | 100 | 102 | 165 | 200 | 225 | /*2 |
| Impact cut resistance | 100 | 103 | 113 | 119 | 121 |  |

*1: Organic micro-fibers used in Example 11.
*2: As a control rubber composition, when HAF carbon black is increased by an amount corresponding to 35 parts by weight of the organic micro-fibers, the amount of carbon black is too large and the dispersion cannot be satisfactorily carried out and a moderate control rubber composition cannot be obtained.

As seen from Table 3, the rubber compositions of the present invention are high in the processability and are noticeably excellent in the crack growth resistance and impact cut resistance.

EXAMPLES 16–17, COMPARATIVE EXAMPLES 38–43

40 parts by weight of HAF carbon black, 2 parts by weight of cobalt naphthenate, 1 part by weight of N-phenyl-N'-isopropyl-p-phenylenediamine and 10 parts by weight of isotactic-polypropylene having various different forms as shown in Table 4 as organic micro-fibers were incorporated based on 100 parts by weight of synthetic polyisoprene rubber and the resulting rubber compositions were kneaded at a rubber temperature of 155° C. by Banbury mixer for 5 minutes, and then 3 parts by weight of zinc oxide, 0.7 part by weight of N-oxydiethylene-2-benzothiazolesulfenamide and 5 parts by weight of sulfur were added thereto to prepare eight kinds of rubber compositions. With respect these compositions, the swell value, roll processability, crack growth resistance, flex resistance and fatigue resistance on drum were determined and the obtained results are shown in Table 4.

The roll processability and crack growth resistance were examined in the same manner as described in Examples 10–15 and the flex resistance and fatigue resistance on drum were examined by the following manner.

Flex resistance

A bending number until cracks are generated in a vulcanized rubber composition by means of De Mattia tester (300 cycle/min) was determined. This value is influenced by the elastic modulus of rubber, so that following to the method for evaluating the average rebound resilience in Example 1, that is the value of a rubber composition reinforced with only carbon black and having the same elastic modulus was referred to as 100 and the value of organic micro-fiber reinforced rubber compositions to be evaluated was shown. The higher the value, the better this property is.

Fatigue resistance on drum

Rubber compositions to be tested were used as a coating rubber (thickness of coating: 0.5 mm) for steel belt cords and tires of a tire size 1000R 20 14PR were produced. These tires were run on an iron drum under conditions of 100% of ordinarily used plan load and speed of 80 km/h and the run distance until the rubber between cord layers is broken, was determined.

TABLE 4

|  |  | Comparative Example 38 | Comparative Example 39 | Example 16 | Example 17 | Comparative Example 40 | Comparative Example 41 | Comparative Example 42 | Comparative Example 43 |
|---|---|---|---|---|---|---|---|---|---|
| Organic micro-fiber | $\bar{l}$ μm | 0.9 | 0.7 | 0.8 | 27 | 34 | 27 | 29.2 | 5.6 |
|  | $\bar{r}$ μm | 0.01 | 0.03 | 0.03 | 0.5 | 0.6 | 1.1 | 0.07 | 0.8 |
|  | $\bar{l}/\bar{r}$ | 90 | 23.3 | 26.7 | 54.0 | 56.7 | 24.5 | 417.1 | 7.0 |
|  | $r_{max}$ μm | 2.8 | 3.2 | 2.9 | 5.3 | 7.2 | 8.9 | 2.6 | 6.6 |
|  | Swell value | 114 | 122 | 121 | 118 | 115 | 121 | 114 | 131 |
| Result | Roll resistance | No | No | No | No | Good | No | No | No |
|  | Crack growth resistance | 101 | 106 | 175 | 224 | 172 | 80 | 94 | 97 |
|  | Flex resistance | 124 | 121 | 146 | 188 | 126 | 89 | 122 | 101 |
|  | Fatigue resistance on drum (Km) | 32,400 | 35,600 | 50,000 Completely run | 50,000 Completely run | * | 38,200 | 31,450 | 35,100 |

*: Roll processability is too poor and tire cannot be produced.

As seen from Table 4, the swell values of the rubber compositions of the present invention are small, so that the dimension stability is good and the crack growth resistance, flex resistance and fatigue resistance on drum are excellent.

EXAMPLES 18–20, COMPARATIVE EXAMPLES 44–46

Rubber compositions having the composition shown in Table 5 were prepared and the swell value, roll processability, rebound resilience, crack growth resistance and fatigue resistance on drum were determined in the same manner as described in Example 16. The rebound resilience was determined in the same manner as described in Example 1. The obtained result is shown in Table 5.

TABLE 5

|  | Comparative Example 44 | Comparative Example 45 | Example 18 | Example 19 | Example 20 | Comparative Example 46 |
|---|---|---|---|---|---|---|
| Synthetic polyisoprene rubber | 90 | 90 | 90 | 90 | 90 | 90 |
| Polybutadiene rubber | 10 | 10 | 10 | 10 | 10 | 10 |
| Isotactic-polypropylene micro-fiber *1 | 1 | 2 | 3 | 10 | 30 | 35 |
| HAF carbon black | 40 | 40 | 40 | 40 | 40 | 40 |
| Cobalt naphthenate | 2 | 2 | 2 | 2 | 2 | 2 |
| 2,2,4-trimethyl-1,2-dihydroquinoline polymer | 1 | 1 | 1 | 1 | 1 | 1 |
| Zinc oxide | 3 | 3 | 3 | 3 | 3 | 3 |
| N-oxydiethylene-2-benzothiazole sulfenamide | 0.6 | 0.6 | 0.6 | 0.6 | 0.6 | 0.6 |
| Sulfur | 5 | 5 | 5 | 5 | 5 | 5 |
| Swell value (%) | 132 | 131 | 125 | 116 | 114 | 111 |
| Roll processability | No | No | No | No | Somewhat good | Good |
| Rebound resilience | 100 | 102 | 118 | 131 | 142 | *2 |
| Crack growth resistance | 100 | 106 | 143 | 175 | 183 | 111 |
| Fatigue resistance on drum (Km) | 40,200 | 41,300 | 50,000 Completely run | 50,000 Completely run | 50,000 Completely run | *3 |

*1: Organic micro-fibers used in Example 11.
*2: As a control rubber composition, when HAF carbon black is increased by an amount corresponding to 35 parts by weight of organic micro-fibers, the amount of carbon black is too large and the dispersion cannot be satisfactorily effected and a moderate control rubber composition cannot be obtained.
*3: Roll processability is too poor and tire cannot be produced.

As seen from Table 5, the swell value of the rubber compositions of the present invention are small, so that the dimension stability is good, and the crack growth resistance and flex resistance are excellent and the durability is high.

What is claimed is:

1. In organic micro-fiber reinforced rubber compositions in which 10–100 parts of weight of carbon black and 3–30 parts by weight of organic micro-fibers are incorporated based on 100 parts by weight of at least one rubber selected from a group consisting of natural rubber, synthetic polyisoprene rubber, butyl rubber, halogenated butyl rubber, polybutadiene rubber, styrene-butadiene copolymeric rubber, ethylene-propylene-diene ternary copolymeric rubber and acrylonitrile-butadiene copolymeric rubber, the improvement comprising using fibers having a glass transition temperature of amorphous portion of lower than 30° C. or higher or 120° C. and a melting point of crystal portion of higher than 160° C., and having an average length of the micro-fibers of 0.8–30 μm, an average diameter of the micro-fibers of 0.02–0.8 μm and a ratio of the average length of the micro-fibers to the average diameter of the micro-fibers of 8–400 as the organic micro-fibers.

2. Micro-organic staple fiber reinforced rubber compositions as claimed in claim 1, wherein said organic micro-fibers are polyvinylidene chloride, polyvinylidene fluoride, poly-p-tert-butylstryrene, poly-p-chlorostyrene, polydichlorostyrene, poly-α-methylstyrene, poly-2-methyl-styrene, poly-2,5-dimethylstyrene, polytrimethylstyrene, poly-p-phenylstyrene, poly-o-vinylbenzyl alcohol, poly-p-vinylbenzyl alcohol, isotactic-polypropylene, poly-4-methyl-1-pentene, poly-vinylnaphthalene, poly-oxymethylene, poly-bisphenol A carbonate, poly-2,3-dimethylbutadiene.

3. Organic micro-fiber reinforced rubber compositions as claimed in claim 1, wherein a swell value when the unvulcanized rubber composition is extruded at 100° C. is less than 130%.

* * * * *